United States Patent

Eslambolchi et al.

[11] Patent Number: 6,094,518
[45] Date of Patent: Jul. 25, 2000

[54] FIBER OPTIC CABLE RESTORATION ENCLOSURE

[75] Inventors: Hossein Eslambolchi, Basking Ridge, N.J.; John Sinclair Huffman, McDonough, Ga.

[73] Assignee: A.T.&T. Corp., New York, N.Y.

[21] Appl. No.: 09/183,476

[22] Filed: Oct. 30, 1998

[51] Int. Cl.[7] .................................................. G02B 6/30
[52] U.S. Cl. ............................................ 385/134; 385/135
[58] Field of Search ..................................... 385/134, 135

[56] References Cited

U.S. PATENT DOCUMENTS

| | | |
|---|---|---|
| 4,319,951 | 3/1982 | Korbelak et al. . |
| 4,359,262 | 11/1982 | Dolan . |
| 5,185,843 | 2/1993 | Aberson et al. . |
| 5,189,725 | 2/1993 | Bensel, III et al. . |
| 5,684,911 | 11/1997 | Burgett . |
| 5,907,653 | 5/1999 | Burek et al. ............................. 385/135 |
| 5,970,199 | 10/1999 | Minchey et al. ........................ 385/135 |
| 5,995,700 | 11/1999 | Burek et al. ............................. 385/135 |

Primary Examiner—Hung N. Ngo

[57] ABSTRACT

An enclosure (10) for temporarily housing a fiber cable splice includes upper and lower halves (14,12) that may be repeatably separated to expose a splice block (20) enclosed therein. The enclosure allows for an interrupted fiber splice arrangement to be securely stored without causing damage to any exposed optical fibers. The bare fibers are disposed in the lower half of the enclosure next to the splice block and held to prevent movement. A pair of grommets (28,30) are inserted in either end of the enclosure to prevent the introduction of water (or any foreign material) into the housing.

4 Claims, 1 Drawing Sheet

FIBER OPTIC CABLE RESTORATION ENCLOSURE

BACKGROUND OF THE INVENTION

The present invention relates to a fiber optic cable restoration enclosure and, more particularly, to an enclosure for temporarily encapsulating a fiber optic cable splice during an interruption of the splicing process.

The use of fiber optic transmission cables has become a standard communications medium in many situations. A typical cable may comprise a plurality of glass fibers, each of which is protected by at least one layer of a coating material. The optical fibers may be assembled into units in which the fibers are held together by binder ribbons to provide a core.

During the service life of a fiber optic cable, the cable may become damaged, or a need may arise to re-route or re-arrange the cable's location. In any event, it may become necessary to splice one fiber cable to another without losing the integrity of the optical signal transmission through the bundle of fibers. Unlike traditional cable wire splicing, optical fiber splicing is rather time-consuming, requiring that each individual pair of fibers being coupled are optically aligned and held with sufficient rigidity to prevent any later movement or vibration to result in misalignment.

Various arrangements exist in the prior art for performing optical fiber splicing. See, for example, U.S. Pat. No. 5,684,911, entitled "Sub-Surface Fiber Optic Splice Housing and Method of Splicing Fiber Optic Cable" issued to M. E. Burgett on Nov. 4, 1997. Burgett discusses a housing that is capable of being repeatably opened and closed (to provide adjustment of the various fiber splices) without jeopardizing the structural integrity, electrical insulation and water tightness within the housing. U.S. Pat. No. 4,319,951, entitled "Fiber Organizer for Splice Cases and Terminals" issued to K. N. Korbelak et al on Mar. 16, 1982 discloses a particular "block" that case be used to hold each optical fiber in a coiled position while being spliced to an associated fiber in another cable.

While these and other arrangements are suitable for the purpose of splicing fiber optic cables, a problem arises when the splicing operation is interrupted before each splice can be made. When interrupted, a number of optical fiber terminations consist of "bare" fiber that are extremely fragile and are very likely to be damaged.

Thus, a need remains for an arrangement for protecting a fiber cable splice in situations where the splicing operation is interrupted before it can be completed.

SUMMARY OF THE INVENTION

The need remaining in the prior art is addressed by the present invention, which relates to a fiber optic cable restoration enclosure and, more particularly, to an enclosure for temporarily encapsulating a fiber optic cable splice during an interruption of the splicing process.

In accordance with the present invention, a temporary splice enclosure comprises a hard plastic tube that has been cut in half lengthwise to allow for the fiber optic cables and splicing block to be placed therein. The splicing block is clamped in place within the enclosure to prevent movement of the block. Grommets are disposed at either end of the enclosure, where the fibers are allowed to exit the enclosure through these grommets. A set of clips are slid over protrusions on each half of the enclosure to hold the halves together, yet allowing for easy release when the need arises to open the enclosure and complete the splicing operation.

The temporary splice enclosure of the present invention is sized to be able to house the exposed ends of both fibers involved in the splice. For example, the outer sheathing may be removed from about 60" of a conventional cable to effectuate a proper splice. The enclosure of the present invention is capable of housing the exposed 60" of optical fibers from each cable, as well as the splicing block.

Other and further features of the present invention will become apparent during the course of the following discussion, and by reference to the accompanying drawings.

BRIEF DESCRIPTION OF THE DRAWINGS

Referring now to the drawings, where like numerals represent like parts in several views.

DETAILED DESCRIPTION

Figure 1:
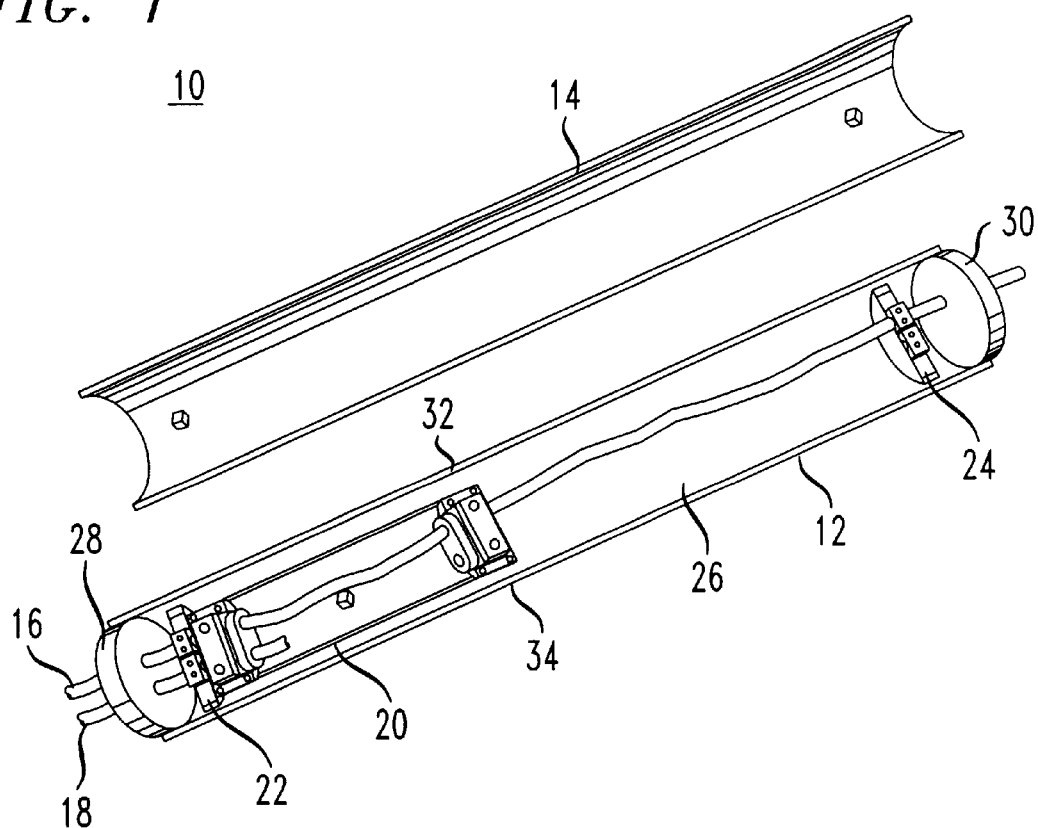
FIG. 1 is an exploded isometric view of a temporary restoration enclosure of the present invention.

A temporary restoration enclosure 10 of the present invention is shown, in an exploded, isometric view, in FIG. 1. Enclosure 10 comprises a tube of suitable material, for example, a relatively hard plastic, that is separable and formed of a lower half 12 and upper half 14. first fiber optic cable 16 (referred to as the "existing" cable) is to be spliced to a second fiber optical cable 18 (referring to as the "new" cable). A conventional splicing block 20 is used to join the individual optical fibers within each cable. There are a variety of arrangements for such a splicing block, and any appropriate arrangement may be used within the temporary restoration enclosure of the present invention. Block 20 is attached to the interior surface of lower half 12 of enclosure 10 to prevent any movement of block 20 during the period of time that the restoration enclosure is in place around the cables.

Figure 2:
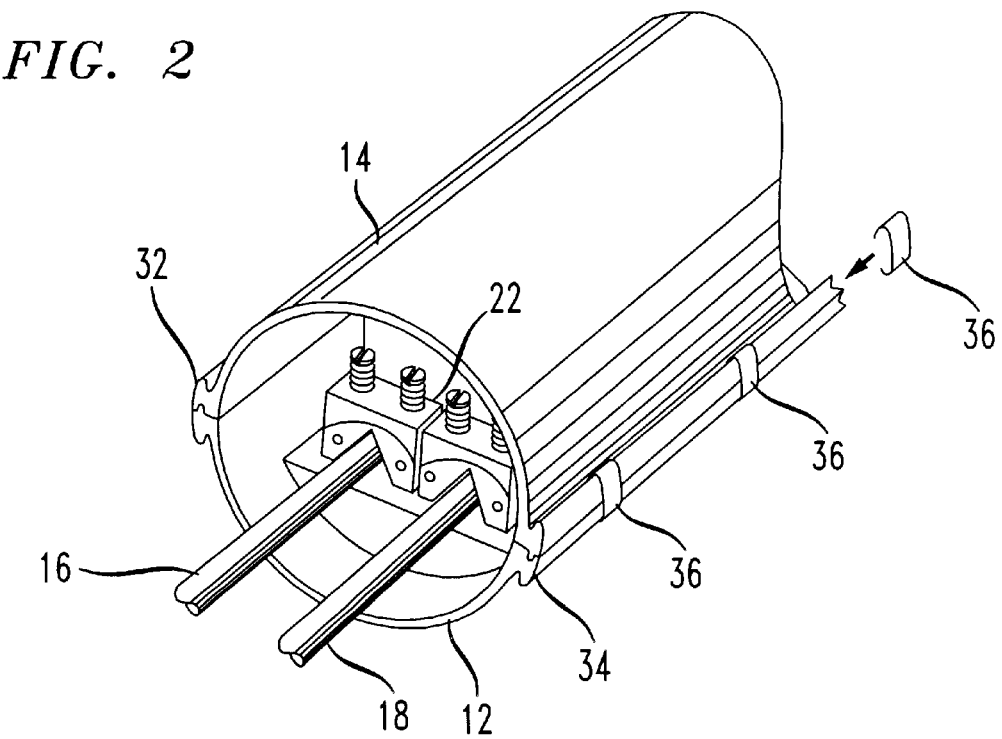
FIG. 2 is a cut-away side view of the enclosure of FIG. 1, illustrating in particular the end clips and foam grommets installed at each end of the enclosure.

A first fiber clamp 22 is disposed adjacent to block 20 at a first end 24 of lower half 12 of enclosure 10. A second fiber clamp 24 is disposed at the opposite end of lower half 12. Each clamp is permanently affixed to lower half 12 of enclosure 10. FIG. 2 is a cut-away side view of enclosure 10 illustrating first clamp 22 and fibers 16,18 exiting clamp 22.

As mentioned above, during the splicing operation a relatively long section of optical fiber must be exposed on existing fiber cable 16. Accordingly, enclosure 10 of the present invention is formed to include a fiber cavity 26 beyond block 20 (see FIG. 1) so that the expose portion of existing fiber cable 16 may be housed and the potential for damage to the exposed fibers during interruption of the splicing operation minimized. That is, should a splicing operation be interrupted for some reason, splicing block 20 is attached to lower half 12 of enclosure 10, with fibers 16 and 18 secured within clamps 22 and 24. Once the fibers are clamped in place, a pair of grommets 28,30 are inserted to completely fill each end of enclosure 10, as shown in FIG. 1. Grommets 28,30 need to comprise a material that allows fibers 16,18 to protrude therethrough, while keeping contaminants from entering enclosure 10 . In an exemplary embodiment, stiff foam grommets may be used.

Upper half 14 of enclosure 10 is thereafter mated with lower half 12 and attached thereto to form the final temporary restoration enclosure apparatus. Various means may be used to provide the attachment. In the exemplary embodiment of FIG. 1, lower half 12 and upper hall 14 are formed to include side extensions 32 and 34, respectively, that extend along the length of each section. A plurality of clips 36 are then slid over the mated combination of lower half 12 and upper half 14, as shown in FIG. 2, to secure the connection between the halves of enclosure 10. When it is desired to re-open enclosure 10 to complete the splicing process, clips 36 are removed, upper half 14 separated from lower half 12 and splicing block 20 is detached.

It is to be understood that the above-described arrangement is simply illustrative of the present invention. Other arrangements may be devised by those skilled in the art which will embody the principles of the invention and fall within the spirit and scope thereof.

What is claimed is:

1. A fiber optic cable restoration enclosure comprising a longitudinally extending lower member including a first end and a second, opposite end;

a longitudinally extending upper member including a first end and a second, opposite end;

at least or splicing block attached to said lower portion for holding a first existing fiber cable and a second new fiber cable;

first and second fiber cable clamps disposed, respectively, at the first and second ends of the longitudinally extending lower member, said first and second fiber cables being secured in said clamps;

first and second grommets disposed to enclose the first and second ends of said enclosure while allowing said first and second cables to extend therethrough; and a clip arrangement for removably attaching the longitudinally extending upper member to the longitudinally extending lower member.

2. An enclosure as defined in claim 1 wherein the upper and lower longitudinally extending members comprise a hard plastic material.

3. An enclosure as defined in claim 1 wherein the clip arrangement comprises longitudinally extending attachment ridges disposed along the upper and lower longitudinally extending members, and at least one clip for sliding over the mated upper and lower members to capture the attachment ridges and secure the upper extending member to the lover extending member.

4. An enclosure as defined in claim 1 wherein the grommets comprise a foam material.

* * * * *

UNITED STATES PATENT AND TRADEMARK OFFICE
CERTIFICATE OF CORRECTION

PATENT NO.   : 6,094,518
DATED        : July 25, 2000
INVENTOR(S)  : Hossein Eslambolchi, John Sinclair Huffman It is certified that error appears in the above-identified patent and that said Letters Patent is hereby corrected as shown below:

In the claims column 3, line 20, replace "at least or" with
--at least one--.

Signed and Sealed this

Seventeenth Day of April, 2001

Attest:

NICHOLAS P. GODICI

Attesting Officer       Acting Director of the United States Patent and Trademark Office